United States Patent [19]

Kawashima et al.

[11] Patent Number: 5,902,859
[45] Date of Patent: May 11, 1999

[54] ELASTIC FLUOROHYDROCARBON RESIN AND METHOD OF PRODUCING SAME

[75] Inventors: Chikashi Kawashima, Scarsdale, N.Y.; Akira Ishihara, Ranzan, Japan; Katunori Kawamura, Kawagoe, Japan; Seiiti Minegishi, Moroyama, Japan

[73] Assignee: Central Glass Company, Limited, Yamaguchi, Japan

[21] Appl. No.: 08/880,545

[22] Filed: Jun. 23, 1997

Related U.S. Application Data

[62] Division of application No. 08/608,354, Feb. 28, 1996, Pat. No. 5,696,215.

[51] Int. Cl.$^6$ .......................... C08F 259/08; C08L 51/00
[52] U.S. Cl. .............................. 525/276; 525/72; 525/263
[58] Field of Search ................................ 525/276, 72, 263

[56] References Cited

U.S. PATENT DOCUMENTS

| | | |
|---|---|---|
| 3,676,190 | 7/1972 | Landler et al. . |
| 4,151,225 | 4/1979 | Büning . |
| 4,308,359 | 12/1981 | Büning . |
| 4,472,557 | 9/1984 | Kawashima et al. . |
| 5,182,342 | 1/1993 | Feiring et al. . |
| 5,473,030 | 12/1995 | Arcella et al. .......................... 526/206 |
| 5,696,215 | 12/1997 | Kawashima et al. . |

FOREIGN PATENT DOCUMENTS

| | | | |
|---|---|---|---|
| 2233288 | 1/1973 | Germany ................ | 526/206 |
| 61-162562 | 7/1986 | Japan .................... | 525/276 |
| 62-195035 | 8/1987 | Japan .................... | 525/276 |
| 1-292013 | 5/1988 | Japan . | |
| 2-60911 | 3/1990 | Japan .................... | 525/276 |
| 3-269008 | 3/1990 | Japan . | |
| 3-269008 | 11/1991 | Japan .................... | 525/276 |
| 2187467 | 9/1954 | United Kingdom . | |
| 2208513 | 4/1989 | United Kingdom .......... | 525/276 |

OTHER PUBLICATIONS

Abstract, "Manufacture of Flexible Fluoropolymers With Good Processability", Yasumura et al., JP 03269008 A2 911129 Heisei.

Abstract, "Manufacture of Flexible Fluorine–Containing Polymers With Improved Thermal Stability", Ishihara et al., JP 05194625 A2 930803 Heisei.

In–House Computer–Generated Doc. No. 116:129967. Yasumura et al JP 90–66624 –900316 Abstract pp. 25 and 26.

English Language Abstracts for each Foreign Patent listed.

*Primary Examiner*—Bernard Lipman
*Assistant Examiner*—N. Sarofim
*Attorney, Agent, or Firm*—Evenson, McKeown, Edwards & Lenahan P.L.L.C.

[57] ABSTRACT

The invention relates to an elastic fluorohydrocarbon resin. This resin is obtained by graft copolymerization of a first segment which is one of fluorine-containing elastomeric and crystalline polymers with a second segment which is the other of these polymers. The first segment is prepared by copolymerizing at least one first unsaturated monomer that has peroxy bond with at least one second fluorine-containing monomer. When the first monomer is dissolved in a first solvent prior to the copolymerization, the copolymerization can be safely conducted with higher yield. This first solvent is selected from a carboxylic ester of t-butanol, methylene chloride, 1,1,1-trichloroethane, and first, second, third and fourth compounds which are respectively represented by $R^1COOR^2$, $C_2H_xCl_yF_z$, $C_3H_xCl_yF_z$, and $C_4H_xCl_yF_z$. When the fluorine-containing elastomeric copolymer as the first segment is purified by contact with a barium salt prior to the graft copolymerization, the elastic fluorohydrocarbon resin becomes improved in thermal stability. When the fluorine-containing elastomeric copolymer having a water content of 0.1–50 wt % as the first segment is dispersed in a liquid medium containing t-butanol and water, it becomes unnecessary to dry this elastomeric copolymer prior to the graft copolymerization. When the fluorine-containing elastomeric copolymer as the first segment is dispersed in another liquid medium containing t-butanol, water, a carboxylic ester and barium hydroxide, the elastic fluorohydrocarbon resin becomes improved in thermal stability with higher graft copolymerization rate.

19 Claims, No Drawings

ELASTIC FLUOROHYDROCARBON RESIN AND METHOD OF PRODUCING SAME

This is a divisional of Ser. No. 08/608,354, filed on Feb. 28, 1996 U.S. Pat. No. 5,696,215.

BACKGROUND OF THE INVENTION

The present invention relates to an elastic fluorohydrocarbon resin and a polymerization method for producing the same.

There are various fluorine-containing crystalline polymers which serve as synthetic resins and have wide application by reason of their characteristic properties attributed to the presence of C-F bond, such as good weather resistance, good chemical resistance and good heat resistance. However, these crystalline resins are unsuited to some uses wherein elasticity or flexibility of the employed resin is a matter of importance, as in the cases of pipes, gaskets, sealing elements, etc.

Where elasticity or flexibility is required besides the favorable properties of fluorohydrocarbon resins it is usual to use fluoroelastomer. However, fluoroelastomers fully exhibit their characteristic physical properties and particularly dynamic properties only after completion of a cross-linking process including the steps of kneading the fluoroelastomer in unvalcanized state with the addition of a cross-linking agent, fillers and stabilizers and of subjecting the kneaded rubber to a heat treatment to accomplish cross-linking. It is inevitable, therefore, that molding of fluoroelastomer requires more complicated operations than molding of crystalline fluorohydrocarbon resins, and often restrictions are placed on the shapes of the fluoroelastomer articles. Besides, fluoroelastomers after the cross-linking process can hardly be remelted for the purpose of additional processing or working.

To obtain a fluorine-containing resin which has a sufficient elasticity but does not need any cross-linking treatment, it has been tried to copolymerize a fluorine-containing monomer that is capable of providing a crystalline polymer having a relatively low glass transition temperature with a different monomer that is capable of sufficiently lowering the degree of crystallinity of the resultant copolymer. However, copolymers obtained by this method generally become lower in melting temperature and, hence, in the upper boundary of the temperature ranges in which the respective copolymers are practicable. Besides, the copolymers tend to undergo considerable changes in the modulus of elasticity with changes in temperature within the aforementioned ranges.

Also it has been tried to obtain a desirable resin by blending a crystalline fluorohydrocarbon resin with either a plasticizer or an elastic polymer. In practice, however, not so many kinds of plasticizers and polymers are known as sufficiently high in mutual solubility with crystalline fluorohydrocarbon polymers. Even when a blending material relatively high in the mutual solubility can be used, often it is impossible to use a desirably large amount of the blending material without adversely influencing the properties of the blended resin compositions. Furthermore, the blended resin compositions are liable to locally remain in a heterogeneously mixed state and, therefore, fail to fully exhibit the expected physical properties.

U.S. Pat. No. 4,472,557 corresponding to JP-A-58-206615 discloses an elastic fluorohydrocarbon resin and a method of producing the same. In this method, a fluorine-containing elastomeric polymer is graft-copolymerized with a fluorine-containing crystalline polymer in 1,1,2-trichlorotrifluoroethane. One of the elastomeric and crystalline polymers, that is, a trunk polymer, is prepared by copolymerizing at least one fluorine-containing monomer with at least one unsaturated monomer that has peroxy bond. The thus prepared elastomeric or crystalline polymer is washed and then dried in vacuum prior to the graft copolymerization.

JP-A-3-269008 discloses a modification of the method of U.S. Pat. No. 4,472,557. In this modification, the graft copolymerization is conducted in a solvent mixture of a good solvent capable of dissolving the fluorine-containing elastomeric polymer and a bad solvent not capable of dissolving the fluorine-containing elastomeric polymer. Examples of the good solvent are ketones, esters and chlorine-containing compounds such as 1,1,2-trichloro-1,2,2-trifluoroethane. Examples of the bad solvent are alcohols (e.g., t-butanol) and saturated hydrocarbons.

JP-A-1-292013 discloses another modification of the method of U.S. Pat. No. 4,472,557. In this modification, the graft copolymerization of a fluorine-containing elastomeric copolymer which is in the form of latex is conducted by redox polymerization in water.

It is generally known that an unsaturated peroxide alone is extremely unstable and thus liable to explode by heat, impact, and the like. However, if such monomer is dissolved in a solvent, it can be safely stored and handled with usual care. As solvents for dissolving unsaturated peroxides, inert solvents such as 1,1,2-trichlorotrifluoroethane and hydrocarbons such as toluene and isoparaffin are generally used. However, the use of 1,1,2-trichlorotrifluoroethane, causing the ozone-layer depletion, is greatly limited, and thus a demand for an alternative to 1,1,2-trichlorotrifluoroethane has been increasing. On the other hand, when the above-mentioned unsaturated peroxide dissolved in a hydrocarbon is used for producing the trunk polymer, the polymerization may terminate at an early stage due to the chain transfer reaction of the radicals of the polymerization initiator or of the monomer, to the solvent. As a consequence, the trunk polymer may become substantially lowered in yield or in molecular weight.

It is general to add various stabilizers to resins for providing the resins with thermal stability. However, if these stabilizers are added to fluororesins, this may cause the fluororesins to have stains or to become inferior in mechanical and chemical characteristics. It has been tried to add various stabilizers to an elastic fluorohydrocarbon resin prepared in accordance with the method of U.S. Pat. No. 4,472,557, for improving thermal stability of this resin, without damaging mechanical and chemical characteristics thereof. However, this could not lead a good result.

SUMMARY OF THE INVENTION

It is an object of the present invention to provide a fluorohydrocarbon resin that has elasticity and retains favorable properties (e.g., good thermal stability) which are characteristic of known fluorohydrocarbon resins.

It is another object of the present invention to provide a method of producing the fluorohydrocarbon resin.

It is still another object of the present invention to provide a fluorine-containing crystalline or elastomeric polymer serving as a trunk polymer in graft copolymerization for producing the fluorohydrocarbon resin.

It is a further object of the present invention to provide a method of producing the fluorine-containing crystalline or elastomeric polymer.

An elastic fluorohydrocarbon resin according to the invention is a copolymer comprising a first segment which is one of a fluorine-containing lastomeric polymer and fluorine-containing crystalline polymer and a second segment which is the others of polymers. The second segment is at least partly grafted to the first segment in this resin. The fluorine-containing elastomeric polymer serving as the first segment has a glass transition temperature below room temperature and a peroxy bond capable of decomposition during graft copolymerization. The fluorine-containing crystalline polymer serving as the first segment has a melting temperature not lower than 130° C. and a peroxy bond capable of decomposition during graft copolymerization.

The fluorine-containing crystalline and elastomeric polymers, each of which serves as a trunk polymer in graft copolymerization for producing the elastic fluorohydrocarbon resin, are respectively produced by the following first and second methods which are not different in fundamental concept.

The first method for producing the fluorine-containing crystalline polymer serving as a trunk polymer comprises the steps of:

(a) dissolving at least one first monomer having (i) at least one double bond and (ii) at least one peroxy bond, in a first solvent to prepare a first solution, said first solvent being at least one selected from the group consisting of a carboxylic ester of t-butanol, methylene chloride, 1,1,1-trichloroethane, and first, second, third and fourth compounds which are respectively represented by the following formulas of (1), (2), (3) and (4) (hereinafter referred to as the first compound (1), the second compound (2), the third compound (3), and the fourth compound (4)); and (b) conducting a copolymerization of the first monomer, which is dissolved in the first solution, with at least one second fluorine-containing monomer,

$$R^1COOR^2 \tag{1}$$

where $R^1$ is hydrogen atom, methyl group, or t-butyl group, $R^2$ is methyl group, ethyl group, n-propyl group, or isopropyl group, and said hydrogen atom and each hydrogen atom of these groups are optionally replaced by chlorine atom or fluorine atom,

$$C_2H_xCl_yF_z \tag{2}$$

where each of x, y and z is an integer from 1 to 4, and x+y+z=6,

$$C_3H_xCl_yF_z \tag{3}$$

where each of x, y and z is an integer from 1 to 6, and x+y+z=8,

$$C_4H_xCl_yF_z \tag{4}$$

where each of x, y and z is an integer from 1 to 8, and x+y+z=10.

The second method for producing the fluorine-containing elastomeric copolymer serving as a trunk polymer comprises the steps of:

(a) dissolving the above-mentioned at least one first monomer in the above-mentioned first solvent to prepare the first solution; and (b) conducting a copolymerization of the first monomer, which is dissolved in the first solution, with at least one second fluorine-containing monomer.

In the first and second methods, the peroxy bond of the first monomer has a decomposition temperature higher than the reaction temperature of the copolymerization. Therefore, this peroxy bond is not decomposed in the copolymerization.

An unsaturated peroxide (i.e., the above-mentioned first monomer) for use in the first and second methods well dissolves in carboxylic esters in general. The thus dissolved unsaturated peroxide is well dispersed and dissolved in a solvent for the copolymerization. However, most of carboxylic esters, if used in the first and second methods, tend to be easily hydrolyzed in each step (b) of these methods. With this, the hydrolysate may be undesirably produced in the middle of the copolymerization. Furthermore, when the unsaturated peroxide dissolved in a carboxylic ester is copolymerized with the second fluorine-containing monomer, the carboxylic ester may cause the chain transfer reaction of radicals to the solvent. With this, the copolymerization may be stopped, and/or the polymerization rate may be substantially lowered.

The inventors unexpectedly found that, when the above-mentioned first solvent according to the invention is used for dissolving therein the unsaturated peroxide in the first and second methods, the chain transfer reaction of radicals to the solvent does not occur at all or at least substantially suppressed; that the unsaturated peroxide can be stably stored in the first solution according to the invention, before the copolymerization; that the unsaturated peroxide dissolved in the first solution can be well dispersed in a solvent for the copolymerization; that each step (a) of the first and second methods does not cause any adverse effects on the yield of copolymerization, on a so-called copolymerizability between the first and second monomers, and on molecular weight of the fluorine-containing crystalline or elastomeric copolymer as the trunk polymer; and that the unsaturated peroxide dissolved in the first solution readily safely undergoes copolymerization with the second fluorine-containing monomer.

An elastic fluorohydrocarbon resin according to the invention is produced by one of the following third and fourth methods which are not different in fundamental concept. The third method comprises the steps of:

(c) providing, in a liquid medium, a dispersion of a fluorine-containing crystalline copolymer which is prepared in accordance with the above-mentioned first method and has a peroxy bond capable of decomposition during graft copolymerization;

(d) introducing into said dispersion at least one third monomer which comprises at least one fluorine-containing monomer and which is capable of providing an elastomeric polymer having a glass transition temperature below room temperature; and (e) polymerizing said third monomer in said dispersion so as to cause decomposition of said peroxy bond of said crystalline copolymer, thereby causing at least a portion of said third monomer to undergo graft copolymerization with said crystalline polymer.

The fourth method for producing the elastic fluorohydrocarbon resin comprises the steps of:

(c) providing, in a liquid medium, a dispersion of a fluorine-containing elastomeric copolymer which is prepared in accordance with the above-mentioned second method and has a peroxy bond capable of decomposition during graft copolymerization;

(d) introducing into said dispersion at least one third monomer which comprises at least one fluorine-containing monomer and which is capable of providing a crystalline polymer having a melting temperature not lower than 130° C.; and (e) polymerizing said third monomer in said dispersion so as to cause decomposition of said peroxy bond of said elastomeric copolymer, thereby causing at least a portion of said third monomer to undergo graft copolymerization with said elastomeric polymer.

An elastic fluorohydrocarbon resin according to the invention is alternatively produced by the following fifth method. The fifth method comprises the steps of:

(a) conducting a copolymerization of at least one first monomer having (i) at least one double bond and (ii) at least one peroxy bond having a decomposition temperature higher than the reaction temperature of the copolymerization with at least one second fluorine-containing monomer, such that the fluorine-containing elastomeric polymer having a peroxy bond capable of decomposition during graft copolymerization is produced;

(b) contacting the fluorine-containing elastomeric polymer with a barium salt for purifying the fluorine-containing elastomeric polymer;

(c) providing, in a liquid medium, a dispersion of said fluorine-containing elastomeric copolymer;

(d) introducing into said-dispersion at least one third monomer which comprises at least one fluorine-containing monomer and which is capable of providing a crystalline polymer having a melting temperature not lower than 130° C.; and (e) polymerizing said third monomer in said dispersion so as to cause decomposition of said peroxy bond, thereby causing at least a portion of said third monomer to undergo graft copolymerization with said elastomeric polymer.

According to the above-mentioned fifth method, the elastic fluorohydrocarbon resin is improved in thermal stability. Therefore, even when this resin is heated, stains (i.e., undesirable colors) are hardly caused thereon.

An elastic fluorohydrocarbon resin according to the invention is further alternatively produced by the following sixth method. The sixth method comprises the steps of:

(a) conducting a copolymerization of at least one first monomer having (i) at least one double bond and (ii) at least one peroxy bond having a decomposition temperature higher than the reaction temperature of the copolymerization, with at least one second fluorine-containing monomer to produce a fluorine-containing elastomeric copolymer having a glass transition temperature below room temperature and a peroxy bond capable of decomposition during graft copolymerization;

(b) adjusting water content of said fluorine-containing elastomeric copolymer such that said copolymer contains 0.1–50 wt % of water;

(c) introducing said fluorine-containing elastomeric copolymer into a liquid medium such that a dispersion of said fluorine-containing elastomeric copolymer is provided;

(d) introducing into said dispersion at least one third monomer which comprises at least one fluorine-containing monomer and which is capable of providing a crystalline polymer having a melting temperature not lower than 130° C.; and (e) polymerizing said third monomer in said dispersion so as to cause decomposition of said peroxy bond, thereby causing at least a portion of said third monomer to undergo graft copolymerization with said elastomeric copolymer.

According to the sixth method, the step of drying the fluorine-containing elastomeric polymer, which step is disclosed in U.S. Pat. No. 4,472,557, can be omitted, without causing any adverse effects on the characteristics of the elastic fluorohydrocarbon resin.

An elastic fluorohydrocarbon resin according to the invention is still further alternatively produced by the following seventh method. The seventh method comprises the steps of:

(a) conducting a copolymerization of at least one first monomer having (i) at least one double bond and (ii) at least one peroxy bond having a decomposition temperature higher than the reaction temperature of the copolymerization, with at least one second fluorine-containing monomer to produce a fluorine-containing elastomeric copolymer having a glass transition temperature below room temperature and a peroxy bond capable of decomposition during graft copolymerization;

(b) introducing said fluorine-containing elastomeric copolymer into a liquid medium containing tertiary butanol, water, carboxylic ester, and a metal hydroxide such that a dispersion of said fluorine-containing elastomeric copolymer is provided;

(c) introducing into said dispersion at least one third monomer which comprises at least one fluorine-containing monomer and which is capable of providing a crystalline polymer having a melting temperature not lower than 130° C.; and (d) polymerizing said third monomer in said dispersion so as to cause decomposition of said peroxy bond, thereby causing at least a portion of said third monomer to undergo graft copolymerization with said elastomeric copolymer.

According to the above-mentioned seventh method, there is provided an advantage that the rate of graft copolymerization is substantially increased and another advantage that, even when the elastic fluorohydrocarbon resin is heated, a pale yellow stain is hardly caused on the resin. Furthermore, when the liquid medium of the seventh method further contains at least one additive defined hereinafter, the generation of specific alcohol(s) acting as a polymerization inhibitor is substantially reduced. Therefore, the recovered liquid medium can be reused for another graft copolymerization. The at least one additive is defined as being selected from the group consisting of potassium dihydrogenphosphate, dipotassium hydrogenphosphate, potassium hydrogenphthalate, sodium citrate, sodium tetraborate, potassium dihydrogencitrate, sodium dihydrogenphosphate, and disodium hydrogenphosphate.

In the invention, it is optional to suitably combine at least two of the above-mentioned first to seventh methods, for producing the elastic fluorohydrocarbon resin. For example, as are exemplified in the aftermentioned Examples 8–16, it is optional to use the first solvent disclosed in the first and second methods, in the fifth to seventh methods.

DESCRIPTION OF THE PREFERRED EMBODIMENTS

In the invention, the unsaturated peroxide (first monomer) is not limited to a particular type. Examples of the unsaturated peroxide are t-butyl peroxymethacrylate, di(t-butyl peroxy) fumarate, t-butyl peroxycrotonate, and unsaturated peroxycarbonates such as t-butyl peroxyallylcarbonate, t-hexylperoxyallylcarbonate, 1,1,3,3-tetramethylperoxyallylcarbonate, t-butylperoxymethacrylcarbonate, 1,1,3,3-tetramethylbutylperoxymethacrylcarbonate, p-menthane peroxyallycarbonate and p-menthane peroxymethacrylcarbonate. Of these examples, t-butyl peroxyallylcarbonate is the most preferable. At least two of these may be mixed together to be used as the unsaturated peroxide in the invention.

In the first and second methods of the invention, the unsaturated peroxide is dissolved in the first solvent in each step (a) of these methods. As stated above, the first solvent is at least one selected from the group consisting of a carboxylic ester of t-butanol, methylene chloride, 1,1,1-trichloroethane, and the first, second, third and fourth compounds (1), (2), (3) and (4). In other words, at least two selected from this group may be mixed together to prepare the first solvent.

In the first and second methods, examples of the carboxylic ester of t-butanol as the first solvent are t-butyl formate, t-butyl acetate, t-butyl chloroacetate, t-butyl chloroformate, t-butyl trifluoroacetate, and t-butyl pivalate. Of these, t-butyl acetate is the most preferable example. At least two of these may be mixed together to be used as the first solvent. Furthermore, it is optional to add other at least one solvent to the carboxylic ester of t-butanol, as long as this optional solvent does not alter fundamental characteristics of the first solvent. Thus, a preferable example of the optional solvent is such that the degree of the chain transfer of radicals to the optional solvent is relatively small. Examples of the optional solvent are perfluoropolyethers, and fluorinated alkanes each of which is in the form of liquid within a range from about −30° C. to the copolymerization temperature, of which has a carbon atom number from 2 to 5, and of which does not have chlorine atom in the molecule.

In the first and second methods, examples of the first compound (1) are methyl acetate, ethyl acetate, n-propyl acetate, methyl propionate, ethyl propionate, ethyl chloroacetate, methyl trifluoroacetate, ethyl trifluoroacetate, methyl pivalate, and ethyl pivalate. Examples of the second compound (2) are 1,1-dichloro-1-fluoroethane, 1-chloro-1,1-difluoroethane, 2-chloro-1,1,1-trifluoroethane, 2,2-dichloro-1,1,1-trifluoroethane, 1,2-dichloro-1,1,2-trifluoroethane, 1,1,2-trichloro-2,2-difluoroethane, and 1,1,2,2-tetrachloro-1-fluoroethane. Examples of the third compound (3) are 3,3-dichloro-1,1,1,2,2-pentafluoropropane, 1,3-dichloro-1,1,2,2,3-pentafluoropropane, 1,1-dichloro-1,2,2,3,3-pentafluoropropane, 1-chloro-1,2,2,3,3-pentafluoropropane, 1-chloro-2,2,3,3,3-pentafluoropropane, and 1-chloro-1,1,2,2,3-pentafluoropropane. Examples of the fourth compound (4) are 1-chloro-1,1,2,2,3,3,4,4-octafluorobutane, 1,1-dichloro-2,2,3,3,4,4,4-heptafluorobutane, 2,2,3-trichloro-1,1,1,3,3,3-hexafluorobutane, 1,1,1-trichloro-3-trifluoromethylpropane, 1,1,2,2,3,3,4-heptachloro-4,4-difluorobutane, 1-chloro-2,2,3,3,4,4,4-heptafluorobutane, 1,2-dichloro-2,3,3,4,4,4-hexafluorobutane, 2,3-dichloro-1,1,1,4,4,4-hexachlorobutane, 1,1,1-trichloro-2,2,4,4,4-pentafluorobutane, 1,1,1,2,2-pentachloro-4,4,4-trifluorobutane, 2-chloro-1,1,1,4,4,4-hexafluorobutane, 1,3-dichloro-1,1,1,4,4,4-pentafluorobutane, and 1,1,1-trichloro-2,2,3,3-tetrafluorobutane. Of these examples of the first, second, third and fourth compounds, methyl acetate, ethyl acetate, methylene chloride, 1,1,1-trichloroethane, 1,1-dichloro-1-fluoroethane, 3,3-dichloro-1,1,1,2,2-pentafluoroethane, and 1,3-dichloro-1,1,2,2,3-pentafluoroethane are particularly preferable.

In the first and second methods, the ratio of the first solvent to the unsaturated peroxide is preferably within a range from 5:95 to 95:5 and more preferably within a range from 20:80 to 50:50. It is preferable to use the first solvent in an amount as small as possible, because the first solvent itself is not necessary in the copolymerization. Therefore, it is preferable that the concentration of the unsaturated peroxide in the first solvent is as close as possible to the maximum concentration at which the unsaturated peroxide is stably dissolved in the first solvent. If the ratio is less than 5:95, the advantageous dilution effect by the first solvent may be insufficient. If the ratio is greater than 95:5, this may adversely influence the copolymerization.

In the invention, the at least one second fluorine-containing monomer for producing the fluorine-containing crystalline polymer serving as a trunk polymer is not limited to a particular type, as long as the second monomer comprises a compound having at least one fluorine atom in the molecule and a polymerizable double bond therein. As this compound, it is particularly preferable to use a substituted ethylene, a substituted propylene or a substituted butene, in each of which hydrogen atoms in the molecule have been partly or totally replaced by halogen atom(s). Examples of this compound are vinyl fluoride, vinylidene fluoride, trifluoroethylene, chlorotrifluoroethylene, hexafluoropropylene, and tetrafluoroethylene.

In the invention, examples of the second monomer for producing the fluorine-containing crystalline polymer serving as a trunk polymer are tetrafluoroethylene, chlorotrifluoroethylene, vinylidene fluoride, vinyl fluoride, a combination of tetrafluoroethylene and ethylene, a combination of chlorotrifluoroethylene and ethylene, a combination of tetrafluoroethylene and a fluorine-substituted vinyl ether, a combination of vinylidene fluoride and tetrafluoroethylene, a combination of vinylidene fluoride and chlorotrifluoroethylene, a combination of vinylidene fluoride and hexafluoropropylene, a combination of vinylidene fluoride and trifluoroethylene, a combination of vinylidene fluoride and hexafluoroacetone, and a combination of vinylidene fluoride, tetrafluoroethylene and hexafluoropropylene.

In the invention, the at least one second fluorine-containing monomer for producing the fluorine-containing elastomeric polymer serving as a trunk polymer is not limited to a particular type, as long as the second monomer comprises a monomer (A) which is a compound having at least one fluorine atom in the molecule and a polymerizable double bond therein and a monomer (B) to be copolymerized with the monomer (A). As this compound, it is particularly preferable to use a substituted ethylene, a substituted propylene or a substituted butene, in each of which hydrogen atoms in the molecule have been partly or totally replaced by halogen atom(s). Examples of this compound are vinyl fluoride, vinylidene fluoride, trifluoroethylene, chlorotrifluoroethylene, hexafluoropropylene, and tetrafluoroethylene. The above-mentioned monomer (B) is not limited to a particular type, and its examples are olefins such as ethylene, propylene and butene, conjugated dienes such as butadiene, and fluorine-substituted vinyl ethers.

In the invention, examples of the at least one second fluorine-containing monomer for producing the fluorine-containing elastomeric polymer serving as a trunk polymer are a combination of vinylidene fluoride and hexafluoropropylene, a wcombination of vinylidene fluoride, hexafluoropropylene and tetrafluoroethylene, a combination of vinylidene fluoride and chlorotrifluoroethylene, a combination of tetrafluoroethylene and propylene, a combination of tetrafluoroethylene and a fluorine-substituted vinyl ether, and a combination of a conjugated diene and a fluorine-containing monomer.

In the invention, it is preferable that the ratio of the unsaturated peroxide to the at least one second fluorine-containing monomer is within a range from 0.05:100 to 20:100 by weight. The use of a smaller amount of unsaturated peroxide will result in insufficient efficiency in the formation of branch polymer at the subsequent graft copolymerization step, but the use of a larger amount of unsaturated peroxide is liable to inhibit the fluorine-containing trunk polymer in the final product from exhibiting its inherent properties.

In the invention, the manner of copolymerization to obtain the fluorine-containing crystalline or elastomeric polymer is not particularly limited. In other words, a common copolymerization using a polymerization initiator, such as emulsion polymerization, suspension polymerization or solution polymerization, may be taken.

In the invention, it is necessary to select a polymerization initiator used in the copolymerization such that radicals are generated at a temperature lower than the decomposition temperature of the peroxy bond of the unsaturated peroxide. In other words, it is necessary to select a suitable polymerization initiator, depending on the type of unsaturated peroxide. Examples of the initiator are benzoyl peroxide, lauroyl peroxide, t-butyl hyponitrite, azobisisobutyronitrile, azobisdimethylvaleronitrile, azobiscyclohexanecarbonitrile, potassium persulfate and ammonium persulfate, each of which has an activation energy for decomposition thereof within a range from 26 to 33 kcal/mol, a combination of iron (II) salt and hydrogen peroxide, a combination of persulfate salt and sodium hydrogensulfite, a combination of cumene hydroperoxide and iron (II) salt, and a combination of benzoyl peroxide and dimethylaniline, each of which has such an activation energy within a range from 15 to 26 kcal/mol, diisopropylperoxydicarbonate and dicyclohexylperoxydicarbonate, a combination of a peroxide (e.g., hydrogen peroxide or a hydroperoxide) and an alkyl metal (e.g., triethyl aluminum, triethyl boron or diethyl zinc) and a combination of oxygen and an alkyl metal, each of which has such an activation energy of 15 kcal/mol.

In the invention, as a solvent for the polymerization, an aqueous medium which optionally contains a water soluble solvent such as alcohol is used in case of emulsion polymerization and suspension polymerization, and a solvent which hardly causes the chain transfer to the solvent is used in case of solution polymerization.

In the invention, the polymerization temperature and time vary depending on the polymerization initiator. This polymerization time is from about 1 to about 50 hr at a polymerization temperature from 0 to 90° C. The polymerization pressure is from the atmospheric pressure to 100 kgf/cm$^2$ and varies depending on the polymerization manner, the raw material supply manner in the polymerization, and the monomer types.

In the invention, a purified fluorine-containing crystalline or elastomeric polymer serving as a trunk polymer can be obtained by removing the polymerization initiator, the solvents and the unreacted monomers from the reaction medium after the polymerization, through salting out, washing, optional drying and the like.

As stated in the above-described step (b) of the fifth method, this method is characterized in that the fluorine-containing elastomeric copolymer is contacted with a barium salt for purifying the fluorine-containing elastomeric copolymer, prior to the graft copolymerization. For conducting this step (b), it is easy and preferable to use an aqueous solution of barium salt as a washing liquid in the washing step of the fluorine-containing elastomeric copolymer or to mix this aqueous solution with another washing liquid. Alternatively, the fluorine-containing elastomeric copolymer may be contacted with a barium salt, after the washing of this copolymer with water, or after the drying of this copolymer. If this copolymer is aggregated, it is preferable to mechanically pulverize the copolymer prior to the step (b).

In the fifth method, examples of the above-mentioned barium salt are barium hydroxide, barium oxide, barium peroxide, barium halides such as barium chloride, barium bromide and barium iodide, barium salts of halogen acids such as barium chlorate, barium salts of per-halogen acids such as barium perchlorate, barium nitrate, and barium salts of organic acids. The barium salt may be dissolved in an organic solvent to be used in the invention. However, in view of environmental, economical and safety aspects, it is preferable to use an aqueous solution of barium salt in the invention. The barium salt concentration of this solution is not particularly limited. However, its concentration is preferably within a range from about 0.01 to about 10 wt % and more preferably within a range from 0.1 to 5 wt %. If it is less than about 0.01 wt %, it is necessary to have a relatively long time for the contact or a relatively large amount of the barium salt solution. If it is greater than about 10 wt %, it may be necessary to wash the fluorine-containing elastomeric copolymer with water after the contact. This contact is conducted at a temperature within a range usually from 0 to 100° C. and preferably from 10 to 50° C. The contact may be conducted at a temperature outside a range from 0 to 100° C., but it may become necessary to add a certain pressure.

In the invention, the graft copolymerization according to the invention is conducted in a manner similar to that of common graft copolymerizations, except in that an initiator is not added in the invention because the peroxy bond of the trunk polymer of the invention is capable of decomposition during graft copolymerization. For example, the graft copolymerization of the invention is conducted at first by introducing the trunk polymer together with a reaction medium into a reaction vessel, using a pulverization device such as homogenizer, to provide a dispersion of the trunk polymer in a liquid medium, then by adding the at least one third monomer and an optional additive(s) used according to need, and then by polymerizing the third monomer in the dispersion for a certain time while the reaction mixture is stirred and its temperature is controlled, thereby causing at least a portion of the third monomer to undergo graft copolymerization with the trunk polymer.

In the above-mentioned third, fourth and fifth methods for producing an elastic fluorohydrocarbon resin according to the invention, the solvent for the graft copolymerization may be an aqueous solvent or an organic solvent. This aqueous solvent contains less than 10 wt % of a water soluble solvent. This water soluble solvent is not limited to a particular type. Examples of the water soluble solvent are alcohols such as methanol, ethanol, n-propanol, i-propanol, n-butanol, sec-butanol and t-butanol, and ketones such as acetone, methyl ethyl ketone and methyl isobutyl ketone. Examples of the above-mentioned optional additive(s) are the chain transfer agent, the initiator decomposition accelerator, the emulsifying agent and the dispersion stabilizer.

In the third, fourth and fifth methods, as to the organic solvent for the graft copolymerization, it is preferable to select a suitable solvent such that the trunk polymer suitably swells by this solvent, that the trunk polymer becomes somewhat smaller in diameter by stirring, and that the obtained graft copolymer does not swell and is easily separated by filtration. As such suitable solvent, it is preferable to use chlorofluorocarbons such as 1,1,2-trichlorotrifluoroethane and 1,1-dichlorotetrafluoroethane. However, these solvents specified as specific Freons (trade name) are limited in use. Therefore, alternative Freons may be used as the organic solvent of the invention. Of alternative Freons, it is preferable to use those having a boiling point from about 0 to about 100° C., such as 1,1-dichloro-1-fluoroethane, 1,3-dichloro-1,1,2,2,3-pentafluoropropane and 3,3-dichloro-1,1,1,2,2-pentafluoropropane. Examples of other preferable organic solvents are a mixture of t-butanol and ethyl acetate, a mixture of t-butanol and 1,1,1-trichloroethane, a mixture of t-butanol, ethyl acetate and water, and a mixture of t-butanol, 1,1,1-trichloroethane and water.

As stated in the above-described step (b) of the sixth method, this method is characterized in that water content of the fluorine-containing elastomeric copolymer is adjusted to a range from 0.1 to 50 wt %. In the sixth method, the thus prepared copolymer is preferably introduced into a liquid medium containing at least tertiary butanol and water.

As stated in the above-described step (b) of the seventh method, this method is characterized in that the fluorine-containing elastomeric copolymer is introduced into a liquid medium containing tertiary butanol, water, and metal hydroxide.

In each of the sixth and seventh methods, the liquid medium further contains another solvent for partially or totally dissolving or swelling the fluorine-containing elastomeric copolymer. Examples of this another solvent are ketones such as acetone, methyl ethyl ketone, and methyl isopropyl ketone; carboxylic esters such as ethyl acetate, isopropyl acetate, n-butyl acetate, t-butyl acetate, ethyl formate, methyl propionate, and ethyl propionate; and chlorine-containing hydrocarbons such as dichloroethane, tetrachloroethylene, trichloroethylene, trichloroethane, isomers thereof, chloroform, methylene chloride, and chlorobenzene. Of these examples, ethyl acetate, methylene chloride, and 1,1,1-trichloroethane are particularly preferable.

In each of the sixth and seventh methods, the amounts of t-butanol, water and the above-mentioned another solvent, which are contained in the liquid medium, are desirably decided depending on the composition of the fluorine-containing elastomeric copolymer, on the type of the third monomer to be grafted with this copolymer, and/or on the type of the another solvent. It is preferable that the total weight of t-butanol and water is within a range from 50 to 95% based on the total weight of the liquid medium. Within this range, the fluorine-containing elastomeric copolymer absorbs the liquid medium and thus somewhat swells. With this, this copolymer becomes well dispersed in the liquid medium, and furthermore the elastic fluorohydrocarbon resin prepared by the graft copolymerization exists in the form of fine particles. Therefore, the handling of the slurry of this resin and the separation of this resin by filtration can be very easily conducted.

In each of the sixth and seventh methods, the weight ratio of t-butanol to water is also desirably decided depending on the composition of the fluorine-containing elastomeric copolymer, on the type of the third monomer to be grafted with this copolymer, and/or on the type of the another solvent. This ratio is preferably from 5/95 to 95/5, more preferably from 20/80 to 90/10, and still more preferably from 40/60 to 80/20.

In each of the sixth and seventh methods, the composition of the liquid medium is decided such that the liquid medium becomes a homogeneous system (phase). For example, in case that ethyl acetate is selected as the another solvent, it is preferable that the weight ratio of t-butanol to water is from 30/70 to 60/40 and that the amount of ethyl acetate is from about 25 to about 50 wt % based on the total weight of the liquid medium.

In the seventh method, the liquid medium further contains a metal hydroxide. When this metal hydroxide is used only for improving the graft copolymerization rate, this metal hydroxide becomes not particularly limited as long as a solution of this metal hydroxide becomes basic. In this case, examples of the metal hydroxide are hydroxides of alkali metals (e.g. Li, Na, Rb, and Cs) and of alkali earth metals (e.g., Mg, Ca, Ba, and Sr). When this metal hydroxide is used for improving the graft copolymerization rate and the thermal stability of the elastic fluorohydrocarbon resin, barium hydroxide is particularly preferable. When metal hydroxides other than barium hydroxide are used, its thermal stability may be damaged.

In the seventh method, the amount of barium hydroxide is preferably from 0.001 to 10 wt % and more preferably from 0.01 to 5 wt %, based on the total weight of the liquid medium. If it is lower than 0.001 wt %, the advantage of the addition of barium hydroxide can not be obtained. If it is more than 10 wt %, barium hydroxide may not be dissolved in the liquid medium depending on the composition of the liquid medium.

In the seventh method, in case that the recovery of the liquid medium and the subsequent reuse thereof are necessary, it was found that barium hydroxide can not be mixed with a mixture of t-butanol, water and a carboxylic ester. If mixed, it becomes impossible to reuse the liquid medium. The reason of this is uncertain. However, it is assumed that the hydrolysis of the carboxylic ester is accelerated by the addition of barium hydroxide, and thus that a specific alcohol acting as a chain transfer agent is generated. In the above case that the reuse of the liquid medium is necessary, it was unexpectedly found that barium hydroxide can be added to the liquid medium if a pH adjusting additive is further added to the liquid medium. That is, if this pH adjusting additive is added, barium hydroxide does not become an obstacle to the reuse of the liquid medium. Examples of the pH adjusting additive are potassium dihydrogenphosphate, dipotassium hydrogenphosphate, potassium hydrogenphthalate, sodium citrate, sodium tetraborate, potassium dihydrogencitrate, sodium dihydrogenphosphate, and disodium hydrogenphosphate. Of these, potassium dihydrogenphosphate is particularly preferable. The amount of the pH adjusting additive is preferably from 1 to 1,000 wt % based on the weight of barium hydroxide. If it is lower than 1 wt %, it is difficult to suppress hydrolysis of the carboxylic ester. If it is higher than 1,000 wt %, the advantageous effect does not further improve.

In the invention, the at least one third monomer which is graft copolymerized with the fluorine-containing crystalline polymer (trunk polymer) is capable of providing an elastomeric polymer (branch polymer) having a glass transition temperature below room temperature. Such third monomer is not limited to a particular monomer. Examples of such third monomer are selected from olefins such as ethylene, propylene and butene, conjugated dienes such as butadiene, and fluorine-substituted vinyl ethers. Preferable examples of such third monomer are combinations of vinylidene fluoride and hexafluoropropylene, combinations of vinylidene fluoride, hexafluoropropylene and tetrafluoroethylene, combinations of vinylidene fluoride and chlorotrifluoroethylene, combinations of tetrafluoroethylene and propylene, combinations of tetrafluoroethylene and fluorine-substituted vinyl ether, and combinations of a conjugated diene and a fluorine-containing monomer. The ratio of one monomer (e.g., vinylidene fluoride) to another monomer (e.g., hexafluoropropylene) in the third monomer is adjusted depending on the aimed mechanical characteristics (particularly softness) of the elastomeric polymer. For example, in case that the elastomeric polymer is a copolymer of vinylidene fluoride and chlorotrifluoroethylene, this copolymer preferably contains 50–85 mol % of vinylidene fluoride to obtain a desirable elasticity.

In the invention, the at least one third monomer which is graft copolymerized with the fluorine-containing elastomeric polymer (trunk polymer) is capable of providing an crystalline polymer (branch polymer) having a melting temperature not lower than 130° C. Such third monomer is not limited to a particular monomer. Examples of such third monomer are tetrafluoroethylene, chlorotrifluoroethylene, vinylidene fluoride and fluorine-substituted vinyl ether.

In the invention, the graft copolymerization temperature and time vary depending mainly on the type of unsaturated peroxide. The graft copolymerization is conducted preferably for a period of time from about 1 to about 50 hr and preferably at a temperature from 50 to 120° C. The graft polymerization pressure varies depending on the polymerization manner, the raw material supply manner in the graft polymerization and the monomer types, but is usually from the atmospheric pressure to about 100 kgf/cm$^2$.

In the invention, the elastic fluorohydrocarbon resin prepared by the graft copolymerization consists essentially of one of the following first and second copolymers. The first copolymer comprises: (a) a first segment which comprises a fluorine-containing crystalline polymer which has a melting temperature not lower than 130° C.; and (b) a second segment which comprises a fluorine-containing elastomeric polymer having a glass transition temperature below room temperature, wherein the second segment is at least partly grafted to the first segment.

In the invention, the above-mentioned second copolymer comprises: (a) a first segment which comprises a fluorine-containing elastomeric polymer having a glass transition temperature below room temperature; and (b) a second segment which comprises a fluorine-containing crystalline polymer which has a melting temperature not lower than 130° C., wherein the second segment is at least partly grafted to the first segment.

In the invention, examples of the elastomeric polymer (branch polymer) which is prepared by the polymerization of the at least one third monomer and grafted to the fluorine-containing crystalline polymer (trunk polymer) are copolymers of vinylidene fluoride and hexafluoropropylene, copolymers of vinylidene fluoride, hexafluoropropylene and tetrafluoroethylene, copolymers of vinylidene fluoride and chlorotrifluoroethylene, copolymers of tetrafluoroethylene and propylene, copolymers of tetrafluoroethylene and a fluorine-substituted vinyl ether, and copolymers of a conjugated diene and a fluorine-containing monomer.

Examples of the crystalline polymer (branch polymer) which has a melting temperature not lower than 130° C. and is prepared by the polymerization of the at least one third monomer and grafted to the fluorine-containing elastomeric polymer (trunk polymer) are polytetrafluoroethylene, polychlorotrifluoroethylene, polyvinylidene fluoride, polyvinyl fluoride, copolymers of tetrafluoroethylene and ethylene, copolymers of chlorotrifluoroethylene and ethylene, copolymers of tetrafluoroethylene and a fluorine-substituted vinyl ether, copolymers of vinylidene fluoride and tetrafluoroethylene, copolymers of vinylidene fluoride and chlorotrifluoroethylene, copolymers of vinylidene fluoride and hexafluoropropylene, copolymers of vinylidene fluoride and trifluoroethylene, copolymers of vinylidene fluoride and hexafluoroacetone, and copolymers of vinylidene fluoride, tetrafluoroethylene and hexafluoropropylene.

In the invention, the weight ratio of the branch polymer to the trunk polymer in the elastic fluorohydrocarbon resin is preferably within a range from 20:100 to 100:100 and more preferably within a range from 40:100 to 80:100. These ranges are nonlimitative ranges and adjusted depending on the aimed characteristics of the elastic fluorohydrocarbon resin. However, in view of the balance between mechanical strength of this resin and softness thereof, it is common to take the above preferable range.

A purified elastic fluorohydrocarbon resin can be obtained by removing the solvents and the unreacted monomers from the reaction medium after the graft polymerization, through salting out, washing, drying and the like.

The following examples are illustrative of the present invention, but these examples are not limitative. The following Examples 1–3 are illustrative of the preparation of the fluorine-containing crystalline copolymer and the resultant elastic fluorohydrocarbon resin respectively in accordance with the first and third methods of the present invention.

EXAMPLE 1

(A) PREPARATION OF FLUORINE-CONTAINING CRYSTALLINE POLYMER

In this step (A), 1,000 g of 1,1,2-trichlorotrifluoroethane, 3 g of diisopropylperoxydicarbonate, and 7.1 g of a t-butyl acetate solution containing 70 wt % of t-butyl peroxyallylcarbonate were introduced into a 2-liter stainless steel autoclave which was secured against pressures up to 50 atm, and, after exhausting the gas atmosphere of the autoclave, 500 g of chlorotrifluoroethylene monomer was additionally charged into the autoclave. The resultant mixture was subjected to radical polymerization reaction at 40° C. for 20 hr with continuous stirring. The reaction product was separated from the solvent, and then washed and dried, thereby obtaining as the result 328 g of a copolymer in the form of white powder. The yield of this copolymer was 65.0%.

A characteristic curve obtained by thermal analysis of the copolymer by using a differential scanning calorimeter (DSC) exhibited an exothermic peak at 160–180° C. The peak was judged to be attributed to the decomposition of peroxy bond. By DSC analysis, the melting temperature of this copolymer was found to be 198° C. By iodimetric titration, the content of active oxygen in the copolymer was measured to be 0.094%.

(B) PREPARATION OF ELASTIC FLUOROHYDROCARBON RESIN

In this step (B), 150 g of the above prepared copolymer and 500 g of 1,1,2-trichlorotrifluoroethane were introduced into a 1-liter stainless steel autoclave which was secured against pressures up to 50 atm. After exhausting the gas atmosphere of the autoclave, 59 g of vinylidene fluoride monomer and 41 g of hexafluoropropylene monomer were additionally charged into the autoclave, and the resultant mixture was subjected to graft copolymerization reaction at 95° C. for 24 hr.

A copolymer formed by this reaction was separated from the solvent and dried to obtain 250 g of white powder. By DSC analysis, the glass transition temperature Tg of this copolymer was determined to be −19° C.

The copolymer prepared in this example was first kneaded by means of two 4-inch rolls which were kept heated at 190° C., and then press-shaped at 210° C. into a 1 mm thick sheet. This sheet had a white color and was elastic and flexible.

Some physical properties of this polymer sheet measured at 23° C. and the melt viscosity measured at 220° C. under 100 kgf/cm$^2$ are shown in Table 1 together with the corresponding data obtained on the samples prepared in Examples 2–7 and 10–13 and Referential Examples 1–6 and 8–9 described hereinafter.

The measurement of the respective items in Table 1 were made by the following methods.

The break strength and elongation were measured at 23° C. by a tension test method in accordance with JIS (Japanese Industrial Standard) K 6301, using AUTOGRAPH (trade name) of Shimazu Co. as a tension tester. The test pieces were of the dumbbell shape, and the tension rate was 200 mm/min.

The tensile modulus test was conducted by at first attaching a test piece having a width of 10 mm, a length of 125 mm and a thickness of 1 mm to a tensile tester in a manner to adjust the distance between two chucks to 100 mm, and then by adding an elongation rate of 10 mm/min at 23° C. The test result was obtained as a curve in a graph showing the relationship between elongation and stress. The tensile modulus (i.e., the ratio of stress to the elongation percentage) was determined using the inclination of the initial rising portion of the curve. As elasticity of the sample increases, the value of tensile modulus becomes smaller.

The Shore hardness was measured on a laminate of four test pieces of the sheet, in accordance with ASTM-D-2240.

In the melt viscosity test, at first, a cylinder kept heated at 200° C. was charged with the graft copolymer resin, followed by a preliminary heating of the cylinder for 5 min. Then, the graft copolymer was extruded from an orifice having a diameter of 1 mm and a length of 10 mm. During the extrusion, the flow rate of the graft copolymer was measured with a flow tester of Shimazu Co. to determine the melt viscosity.

EXAMPLE 2

(A) PREPARATION OF FLUORINE-CONTAINING CRYSTALLINE POLYMER

In this step (A), 560 g of pure water, 240 g of t-butanol, 2 g of sodium tetraborate, 1.7 g of di-n-propylperoxydicarbonate, and 3.4 g of the same t-butyl acetate solution of t-butyl peroxyallylcarbonate as that of Example 1 were introduced into a 2-liter stainless steel autoclave which was secured against pressures up to 50 atm, and, after exhausting the gas atmosphere of the autoclave, 233 g of chlorotrifluoroethylene monomer and 5.5 g of vinylidene fluoride were additionally charged into the autoclave. The resultant mixture was subjected to radical polymerization reaction at 40° C. for 20 hr with continuous stirring. The reaction product was separated from the solvent, and then washed and dried, thereby obtaining as the result 162 g of a copolymer in the form of white powder. The yield of this copolymer was 67.1%.

The DSC curve of the thus formed copolymer had an exothermic peak at 160–180° C., which was attributed to the decomposition of peroxy bond, and the melting temperature of this copolymer was found to be 193° C. By iodimetric titration, the content of active oxygen in the copolymer was measured to be 0.082%.

(B) PREPARATION OF ELASTIC FLUOROHYDROCARBON RESIN

In this step (B), 150 g of the above prepared copolymer and 500 g of 1,1,2-trichlorotrifluoroethane were introduced into a 1-liter stainless steel autoclave which was secured against pressures up to 50 atm. After exhausting the gas atmosphere of the autoclave, 50 g of vinylidene fluoride monomer and 30.5 g of chlorotrifluoroethylene monomer were additionally charged into the autoclave, and the resultant mixture was subjected to graft copolymerization reaction at 95° C. for 24 hr.

A copolymer formed by this reaction was separated from the solvent and dried to obtain 205 g of white powder. By DSC analysis, the glass transition temperature Tg of this copolymer was determined to be −24° C.

A sheet having a thickness of 1 mm was produced from the copolymer prepared in this example, in the same manner as that in Example 1. This sheet had a white color and was elastic and flexible.

REFERENTIAL EXAMPLE 1

In this referential example, Example 1 was repeated except in that the t-butyl acetate solution was replaced by a commercial product of pure t-butylperoxyallylcarbonate having a purity of 98%. In this commercial product, t-butanol and allylalcohol constitute the rest thereof. As the result of the step (A), 313 g of a copolymer was produced. The yield of this copolymer was 62.0%.

The melting temperature of this copolymer was found to be 198° C. By iodimetric titration, the content of active oxygen in the copolymer was measured to be 0.093%.

In the step (B), 257 g of a copolymer was obtained. By DSC analysis, the glass transition temperature Tg of this copolymer was determined to be −23° C.

COMPARATIVE EXAMPLE 1

In this comparative example, Example 1 was repeated except in that the t-butyl acetate solution was replaced by a toluene solution containing 70% of t-butylperoxyallycarbonate. A copolymer obtained in the step (A) had a substantially low yield of 8.2%. Therefore, the step (B) was not conducted.

TABLE 1

|  | Break Strength (kgf/cm$^2$) | Elongation at Break (%) | Elasticity (kgf/cm$^2$) | Hardness (Shore D) | Melt Viscosity (X 10$^4$ P) |
| --- | --- | --- | --- | --- | --- |
| Example 1 | 185 | 340 | 1,900 | 60 | 1.5 |
| Example 2 | 209 | 420 | 1,650 | 58 | 1.3 |
| Ref. Ex. 1 | 200 | 400 | 1,850 | 59 | 1.5 |
| Example 3 | 215 | 460 | 1,750 | 58 | 1.5 |

TABLE 1-continued

| | Break Strength (kgf/cm$^2$) | Elongation at Break (%) | Elasticity (kgf/cm$^2$) | Hardness (Shore D) | Melt Viscosity (X 10$^4$ P) |
|---|---|---|---|---|---|
| Ref. Ex. 2 | 208 | 420 | 1,850 | 59 | 1.5 |
| Example 4 | 280 | 480 | 1,200 | 52 | 1.2 |
| Example 5 | 210 | 540 | 880 | 48 | 1.5 |
| Ref. Ex. 3 | 300 | 450 | 1,350 | 55 | 1.3 |
| Ref. Ex. 4 | 65 | 720 | 400 | 30 | 22 |
| Ref. Ex. 5 | 380 | 120 | 8,600 | 80 | 0.8 |
| Example 6 | 220 | 510 | 1,030 | 49 | 1.1 |
| Example 7 | 230 | 490 | 1,150 | 52 | 1.2 |
| Ref. Ex. 6 | 300 | 450 | 1,350 | 55 | 1.3 |
| Example 10 | 260 | 540 | 1,350 | 52 | 1.8 |
| Example 11 | 230 | 610 | 1,180 | 51 | 3.5 |
| Example 12 | 210 | 590 | 1,200 | 51 | 1.2 |
| Example 13 | 220 | 510 | 1,160 | 50 | 1.5 |
| Ref. Ex. 8 | 250 | 490 | 1,050 | 49 | 4.0 |
| Ref. Ex. 9 | 270 | 490 | 1,400 | 53 | 1.1 |

EXAMPLE 3

In this example, Example 2 was repeated except in that the t-butyl acetate solution was replaced by 3.4 g of a methylene. chloride solution containing 70 wt % of t-butylperoxyallylcarbonate. As the result of the step (A), 151 g of a copolymer was produced in the form of white powder. The yield of this copolymer was 62.8%.

The DSC curve of the thus formed copolymer in the step (A) had an exothermic peak at 160–180° C., which was attributed to the decomposition of peroxy bond, and the melting temperature of this copolymer was found to be 193° C. By iodimetric titration, the content of active oxygen in the copolymer was measured to be 0.085%.

In the step (B), 202 g of a copolymer was obtained in the form of white powder. By DSC analysis, the glass transition temperature Tg of this copolymer was determined to be –24° C.

REFERENTIAL EXAMPLE 2

In this referential example, Example 3 was repeated except in that the methylene chloride solution was replaced by a commercial product of pure t-butylperoxyallylcarbonate which is the same as that in Referential Example 1. As the result of the step (A), 159 g of a copolymer was produced. The yield of this copolymer was 66.2%.

The melting temperature of this copolymer was found to be 198° C. By iodimetric titration, the content of active oxygen in the copolymer was measured to be 0.080%.

In the step (B), 215 g of a copolymer was obtained. By DSC analysis, the glass transition temperature Tg of this copolymer was determined to be –23° C.

COMPARATIVE EXAMPLE 2

In this Comparative Example, Example 3 was repeated except in that the methylene chloride solution was replaced by the same toluene solution of t-butyl peroxyallylcarbonate as that of Comparative Example 1. A copolymer obtained in the step (A) had a substantially low yield of 8.2%. Therefore, the step (B) was not conducted.

The following Examples 4–7 are illustrative of the preparation of the fluorine-containing crystalline copolymer and the resultant elastic fluorohydrocarbon resin respectively in accordance with the second and fourth methods of the present invention.

EXAMPLE 4

(A) PREPARATION OF FLUORINE-CONTAINING ELASTOMERIC POLYMER

In this step (A), 900 g of pure water, 2.9 g of potassium persulfate, 2.2 g of ammonium perfluorooctanoate, 2.7 g of sodium tetraborate, 1.2 g of potassium dihydrophosphate, and 1.8 g of the same t-butyl acetate solution of t-butyl peroxyallylcarbonate as that in Example 1 were introduced into a 2-liter stainless steel autoclave which was secured against pressures up to 100 atm, and, after exhausting the gas atmosphere of the autoclave, 83 g of chlorotrifluoroethylene monomer and vinylidene fluoride monomer were additionally charged into the autoclave. The resultant mixture was subjected to radical polymerization reaction at 50° C. with continuous stirring. When the reaction temperature reached 50° C., the autoclave inside pressure was 40 kgf/cm$^2$. The pressure decreased from 40 kgf/cm$^2$ as the polymerization reaction proceeded. When the pressure reached 30 kgf/cm$^2$, the reaction temperature was increased to 60° C. Then, when the pressure reached 7 kgf/cm$^2$, the reaction mixture was cooled down, and at the same time the monomers were purged from the reaction mixture, thereby terminating the polymerization reaction. The period of polymerization time was about 9 hr. The reaction product had the appearance of white latex, and by a salting-out treatment it turned into a rubber-like powder. This powder was centrifuged, then washed with water, and then again centrifuged. With this, 333 g of an elastomeric copolymer powder was obtained. After the second centrifugation, the water content of the copolymer powder was measured to be 28%. The yield of the copolymer was 90.0%.

50 g of the obtained copolymer powder was dried in vacuum, then washed with n-hexane to completely remove unreacted residue of t-butyl peroxyallylcarbonate and again dried in vacuum, thereby obtaining 36 g of copolymer in the form of white powder. The DSC curve of the thus formed copolymer had an exothermic peak at 160–180° C., which was attributed to the decomposition of peroxy bond. By DSC analysis at low temperatures, the glass transition temperature Tg of the copolymer was determined to be –25° C. By iodimetric titration, the content of active oxygen in the copolymer was measured to be 0.039%.

(B) PREPARATION OF ELASTIC FLUOROHYDROCARBON RESIN

In this step (B), 150 g of the above prepared copolymer having a water content of 28%, 275 g of t-butanol, and 225 g of ethyl acetate were introduced into a 1-liter stainless steel autoclave which was secured against pressures up to 50 atm. After exhausting the gas atmosphere of the autoclave, the temperature of the reaction mixture was increased to 90° C. Then, vinylidene fluoride monomer was continuously blown into the autoclave under a pressure of 20 kgf/cm$^2$, thereby conducting graft copolymerization for 14 hr with continuous stirring. After the copolymerization, unreacted monomers were purged from the autoclave. While water was added to the obtained slurry, t-butanol and ethyl acetate as solvents were distilled out and recovered. With this, a liquid dispersion of an elastic fluorohydrocarbon resin in water was obtained. This dispersion was centrifuged and then dried, thereby obtaining 153 g of a copolymer in the form of white powder. By DSC analysis, the melting temperature of this copolymer was found to be 163° C. This copolymer was first kneaded by means of two 4-inch rollers which were kept heated at 180° C., and then press-shaped into a 1 mm thick sheet having widths of 200 mm. This sheet was semitransparent and elastic and flexible.

COMPARATIVE EXAMPLE 3

In this Comparative Example, the step (A) of Example 4 was repeated except in that the t-butyl acetate solution was replaced by the toluene solution of t-butyl peroxyallylcarbonate of Comparative Example 1 and that the polymerization was conducted for 18 hr. An initial autoclave inside pressure of 40 kgf/cm$^2$ decreased to only 38 kgf/cm$^2$ in the polymerization. Therefore, it was found that the polymerization did not proceed sufficiently. The yield of a copolymer obtained in the step (A) was only 5.2%. Therefore, the step (B) was not conducted.

COMPARATIVE EXAMPLE 4

In this Comparative Example, the step (A) of Example 4 was repeated except in that the t-butyl acetate solution was replaced by an isooctane solution containing 70 wt % of t-butyl peroxyallylcarbonate and that the polymerization was conducted for 18 hr. An initial autoclave inside pressure of 40 kgf/cm$^2$ decreased to only 35 kgf/cm$^2$ in the polymerization. Therefore, it was found that the polymerization did not proceed sufficiently. The yield of a copolymer obtained in the step (A) was only 7.3%. Therefore, the step (B) was not conducted.

REFERENTIAL EXAMPLE 3

In this referential example, Example 4 was repeated except in that the t-butyl acetate solution was replaced by a commercial product of pure t-butylperoxyallylcarbonate which is the same as that in Referential Example 1. The polymerization time in the step (A) was about 9 hr. A copolymer obtained in the step (A) was found to have a glass transition temperature of −23° C. The yield of this copolymer was 85.3%. By iodometric titration, the content of active oxygen in the copolymer was measured to be 0.037%.

REFERENTIAL EXAMPLE 4

A copolymer of vinylidene fluoride and chlorotrifluoroethylene as a fluororubber, KEL-F3700 (trade name) of 3M Co., was subjected to the same evaluation tests as those in Example 1.

REFERENTIAL EXAMPLE 5

A polyvinylidene fluoride as a homopolymer of vinylidene fluoride, HYLAR460 (trade name) of AUSIMONT Co., was subjected to the same evaluation tests as those in Example 1.

EXAMPLE 5

(A) PREPARATION OF FLUORINE-CONTAINING ELASTOMERIC POLYMER

In this step (A), 900 g of pure water, 2.9 g of potassium persulfate, 2.2 g of ammonium perfluorooctanoate, and 1.8 g of a t-butyl acetate solution of t-butyl peroxyallylcarbonate which is the same as that in Example 1 were introduced into a 2-liter stainless steel autoclave which was secured against pressures up to 100 atm, and, after exhausting the gas atmosphere of the autoclave, the reaction mixture was subjected to radical polymerization reaction at 50° C., while a gas mixture in which vinylidene fluoride monomer and hexafluoropropylene monomer had been mixed together in a molar ratio of 75:25 was blown into the reaction mixture. This gas mixture was added in a manner to maintain the autoclave inside pressure at 18 kgf/cm$^2$. At the time of 6 hr after the start of the polymerization, the reaction mixture was cooled down and at the same time the unreacted monomers were purged from the reaction mixture, thereby terminating the polymerization reaction. The reaction product had the appearance of white latex, and by a salting-out treatment it turned into a white rubber-like powder. This powder was centrifuged, then washed with water, and then again centrifuged. With this, 170 g of an elastomeric copolymer powder was obtained. The DSC curve of this copolymer had an exothermic peak at 160–180° C., which was attributed to the decomposition of peroxy bond. By DSC analysis at low temperatures, the glass transition temperature Tg of the copolymer was determined to be −19° C. By iodometric titration, the content of active oxygen in the copolymer was measured to be 0.042%.

(B) PREPARATION OF ELASTIC FLUOROHYDROCARBON RESIN

In this step (B), 150 g of the above prepared copolymer and 500 g of 1,1,2-trichlorotrifluoroethane were introduced into a 1-liter stainless steel autoclave which was secured against pressures up to 50 atm. After exhausting the gas atmosphere of the autoclave, the temperature of the reaction mixture was increased to 105° C. Then, vinylidene fluoride monomer was continuously blown into the reaction mixture under a pressure of 14 kgf/cm$^2$, thereby conducting graft copolymerization for 16 hr. After the copolymerization, unreacted monomers were purged from the autoclave. While water was added to the thus obtained slurry, 1,1,2-trichlorotrifluoroethane used as a solvent was distilled out and then recovered. With this, a liquid dispersion of an elastic fluorohydrocarbon resin in water was obtained. This dispersion was centrifuged and then dried, thereby obtaining 240 g of a copolymer in the form of white powder. By DSC analysis, the melting temperature of this copolymer was found to be 167° C. A sheet was prepared from this copolymer in the same manner as that in Example 4. This sheet was semitransparent and elastic and flexible.

EXAMPLE 6

(A) PREPARATION OF FLUORINE-CONTAINING ELASTOMERIC POLYMER

The step (A) of Example 4 was repeated except in that the t-butyl acetate solution was replaced by a methylene chloride solution of t-butyl peroxyallylcarbonate which is the same as that in Example 3, that, when the autoclave inside pressure reached 8 kgf/cm$^2$, in place of 7 kgf/cm$^2$, the reaction mixture was cooled down, and that the period of polymerization time was about 10 hr in place of about 9 hr. With this, 290 g of an elastomeric copolymer powder having a water content of 28% was obtained. The yield of the copolymer was 78.8%.

36 g of a copolymer in the form of white powder was obtained from the above prepared copolymer in the same way as that in Example 4. The DSC curve of the thus formed copolymer had an exothermic peak at 160–180° C., which was attributed to the decomposition of peroxy bond. By DSC analysis at low temperatures, the glass transition temperature Tg of the copolymer was determined to be −24° C. By iodometric titration, the content of active oxygen in the copolymer was measured to be 0.037%.

(B) PREPARATION OF ELASTIC FLUOROHYDROCARBON RESIN

The step (B) of Example 4 was repeated. With this, 340 g of a copolymer in the form of white powder was obtained.

By DSC analysis, the melting temperature of this copolymer was found to be 163° C. A sheet was prepared from this copolymer in the same manner as that in Example 4. This sheet was semitransparent and elastic and flexible.

COMPARATIVE EXAMPLE 5

In this comparative example, the step (A) of Example 6 was repeated except in that the methylene chloride solution was replaced by the toluene solution of t-butyl peroxyallyl-carbonate of Comparative Example 1 and that the polymerization was conducted for 18 hr. An initial autoclave inside pressure of 40 kgf/cm$^2$ decreased to only 38 kgf/cm$^2$ in the polymerization. Therefore, it was found that the polymerization did not proceed sufficiently. The yield of a copolymer obtained in the step (A) was only 5.2%. Therefore, the step (B) was not conducted.

COMPARATIVE EXAMPLE 6

In this comparative example, the step (A) of Example 6 was repeated except in that the methylene chloride solution was replaced by an isooctane solution containing 70 wt % of t-butyl peroxyallylcarbonate and that the polymerization was conducted for 18 hr. An initial autoclave inside pressure of 40 kgf/cm$^2$ decreased to only 35 kgf/cm$^2$ in the polymerization. Therefore, it was found that the polymerization did not proceed sufficiently. The yield of a copolymer obtained in the step (A) was only 7.3%. Therefore, the step (B) was not conducted.

EXAMPLE 7

(A) PREPARATION OF FLUORINE-CONTAINING ELASTOMERIC POLYMER

The step (A) of Example 6 was repeated except in that the methylene chloride solution was replaced by a 1,1-dichloro-1-fluoroethane solution containing 30 wt % of t-butyl peroxyallylcarbonate. With this, an elastomeric copolymer powder was obtained. The yield of the copolymer was 80.2%. By DSC analysis at low temperatures, the glass transition temperature Tg of the copolymer was determined to be −25° C. By iodimetric titration, the content of active oxygen in the copolymer was measured to be 0.039%.

(B) PREPARATION OF ELASTIC FLUOROHYDROCARBON RESIN

The step (B) of Example 4 was repeated. With this, a copolymer in the form of white powder was obtained. A sheet was prepared from this copolymer in the same manner as that in Example 4. This sheet was semitransparent and elastic and flexible.

REFERENTIAL EXAMPLE 6

In this Referential Example, Example 6 was repeated except in that the methylene chloride solution was replaced by a commercial product of pure t-butylperoxyallylcarbonate which is the same as that in Referential Example 1. The polymerization time in the step (A) was about 9 hr. A copolymer obtained in the step (A) was found to have a glass transition temperature of −23° C. The yield of this copolymer was 85.3%. By iodimetric titration, the content of active oxygen in the copolymer was measured to be 0.037%.

The following Examples 8–9 are illustrative of the preparation of the elastic fluorohydrocarbon resin in accordance with the fifth method of the present invention.

EXAMPLE 8

(A) PREPARATION OF FLUORINE-CONTAINING ELASTOMERIC POLYMER

At first, 250 g of an elastomeric copolymer powder which had been prepared in the same manner as in Example 4 was introduced into a 2-liter glass beaker. Then, 1 liter of an aqueous solution containing 0.5% of barium hydroxide was additionally introduced thereinto. This reaction mixture was stirred with a mixer, ULTRA DISPERSER (trade name) of Tokushu Kikakoh Co., at a rate of 1,000 rpm for 30 min. Then, the reaction mixture was centrifuged, followed by washing with ion exchanged water. This treatment (centrifugation followed by washing) was repeated, until pH of the ion exchanged water after the washing becomes about 7, to adjust the water content of the copolymer to 30%.

(B) PREPARATION OF ELASTIC FLUOROHYDROCARBON RESIN

In this step (B), 215 g of the above prepared copolymer having a water content of 30% and 1,000 g of 1,1,2-trichlorotrifluoroethane were introduced into a 2-liter stainless steel autoclave which was secured against pressures up to 50 atm. After exhausting the gas atmosphere of the autoclave, the temperature of the reaction mixture was increased to 98° C. Then, vinylidene fluoride monomer was continuously blown into the reaction mixture under a pressure of 14 kgf/cm$^2$, thereby conducting graft copolymerization with continuous stirring. When 58 g of the vinylidene fluoride monomer was consumed, the blowing was terminated. Then, the reaction mixture was rapidly cooled down and at the same time the unreacted monomers were purged from the autoclave, thereby terminating the graft copolymerization. The obtained polymer was separated from the solvent and then dried, thereby obtaining 208 g of a copolymer in the form of white powder. A sheet was prepared from this copolymer in the same manner as that in Example 4. This sheet was semitransparent and elastic and flexible. This sheet was subjected to a thermal stability evaluation test. In this test, the sheet was put in a gear oven kept heated at 220° C. for 1 hr. Then, the degree of coloring of the sheet was determined by the "b value" of a so-called Hunter system, with a color computer made by Tokyo Denshoku Co. The results are shown in Table 2.

If an object has a b value of 0, this object is seen by the human naked eye as having no color. As the b value becomes larger, the degree of coloring of an object increases. For example, if an object has a b value of 0.5, 1.5, or 3.0, this object is seen by the human naked eye as respectively being very slightly colored, slightly colored, or markedly colored. Furthermore, if an object has a b value of 6.0, 12.0, or higher than 12.0, this object is seen as respectively being more markedly colored, highly colored, or very highly colored.

In addition to the above-mentioned sheet, other three sheets were prepared in similar manners, at first by respectively contacting the fluorine-containing elastomeric polymer with aqueous solutions respectively containing 0.2%, 1.0% and 3.0% of barium hydroxide, prior to the preparation of respective elastic fluorohydrocarbon resins, and then by press-shaping these resins. These three sheets were also subjected to the same thermal stability evaluation test. The results are shown in Table 2.

EXAMPLE 9

In this example, Example 8 was repeated except in that barium hydroxide was replaced by barium perchlorate. The results are shown in Table 2.

COMPARATIVE EXAMPLES 7–8

In Comparative Examples 7–8, Example 8 was repeated except in that barium hydroxide was replaced by sodium hydroxide and calcium hydroxide, respectively. The results are shown in Table 2.

REFERENTIAL EXAMPLE 7

In this referential example, Example 8 was repeated except in that the step of contacting the elastomeric copolymer prepared in the step (A), with an barium salt, was omitted. The water content of the elastomeric copolymer was adjusted to 30% by using ion exchanged water as in Example 8. The results are shown in Table 2.

TABLE 2

| | Metal Salt for Contact with FEC* | Metal Salt Conc. (wt %) | b Values before test | b Values after test |
|---|---|---|---|---|
| Example 8 | Ba(OH)$_2$ | 0.2 | 2.8 | 7.3 |
| " | " | 0.5 | 2.2 | 6.0 |
| " | " | 1.0 | 1.5 | 5.2 |
| " | " | 3.0 | 2.5 | 5.8 |
| Example 9 | Ba(ClO$_4$)$_2$ | 0.2 | 3.0 | 8.5 |
| " | " | 0.5 | 2.8 | 8.2 |
| " | " | 1.0 | 3.0 | 9.0 |
| " | " | 3.0 | 3.2 | 9.2 |
| Com. Ex. 7 | NaOH | 0.2 | 3.6 | 20.8 |
| " | " | 0.5 | 4.0 | 24.0 |
| " | " | 1.0 | 4.5 | 24.2 |
| " | " | 3.0 | 5.3 | 26.0 |
| Com. Ex. 8 | Ca(OH)$_2$ | 0.2 | 3.8 | 18.5 |
| " | " | 0.5 | 4.2 | 20.6 |
| " | " | 1.0 | 4.7 | 21.5 |
| " | " | 3.0 | 6.5 | 21.3 |
| Ref. Ex. 7 | — | — | 3.4 | 15.0 |

*FEC: fluorine-containing elastomeric copolymer

The following Examples 10–13 are illustrative of the preparation of the elastic fluorohydrocarbon resin in accordance with the sixth method of the present invention.

EXAMPLE 10

(A) PREPARATION OF FLUORINE-CONTAINING ELASTOMERIC POLYMER

In this step (A), the step (A) of Example 4 was repeated.

(B) PREPARATION OF ELASTIC FLUOROHYDROCARBON RESIN

In this step (B), 342 g of the above prepared copolymer having a water content of 28%, 480 g of t-butanol, 174 g of water, and 392 g of ethyl acetate were introduced into a 2-liter stainless steel autoclave which was secured against pressures up to 50 atm. After exhausting the gas atmosphere of the autoclave, the temperature of the reaction mixture was increased to 98° C. Then, vinylidene fluoride monomer was continuously blown into the reaction mixture under a pressure of 20 kgf/cm$^2$, thereby conducting graft copolymerization with continuous stirring. When 105 g of the vinylidene fluoride monomer was consumed, the blowing was terminated. Then, the reaction mixture was rapidly cooled down and at the same time the unreacted monomers were purged from the autoclave, thereby terminating the graft copolymerization. The obtained polymer was separated from the solvent and then dried, thereby obtaining 351 g of a copolymer in the form of white powder. A sheet was prepared from this copolymer in the same manner as that in Example 4. This sheet was semitransparent and elastic and flexible.

EXAMPLE 11

Example 10 was repeated except in that the liquid medium composition in the graft copolymerization was changed. In fact, the liquid medium of this example contained 61 wt % of t-butanol, 13 wt % of water in which water contained in the copolymer prepared in the step (A) is excluded, and 26 wt % of ethyl acetate.

EXAMPLE 12

Example 10 was repeated except in that the liquid medium composition in the graft copolymerization was changed. In fact, the liquid medium of this example contained 46 wt % of t-butanol, 17 wt % of water in which water contained in the copolymer prepared in the step (A) is excluded, and 37 wt % of 1,1,1-trichloroethane.

EXAMPLE 13

Example 10 was repeated except in that the liquid medium composition in the graft copolymerization was changed. In fact, the liquid medium of this example contained 46 wt % of t-butanol, 17 wt % of water in which water contained in the copolymer prepared in the step (A) is excluded, and 37 wt % of methylene chloride.

REFERENTIAL EXAMPLE 8

Example 10 was slightly modified as follows. The copolymer having a water content of 28%, which was prepared in the step (A), was dried in vacuum, then washed with n-hexane, and then again dried in vacuum, thereby obtaining a copolymer having a water content less than 0.1%. This copolymer was graft copolymerized in a liquid medium composed of only 1,1,2-trichlorotrifluoroethane.

REFERENTIAL EXAMPLE 9

Referential Example 8 was slightly modified as follows. A copolymer having a water content less than 0.1% was graft copolymerized in a liquid medium composed of 55% of t-butanol and 45% of ethyl acetate.

The following Examples 14–16 are illustrative of the preparation of the elastic fluorohydrocarbon resin in accordance with the seventh method of the present invention.

EXAMPLE 14

(A) PREPARATION OF FLUORINE-CONTAINING ELASTOMERIC POLYMER

In this step (A), the step (A) of Example 4 was repeated.

(B) PREPARATION OF ELASTIC FLUOROHYDROCARBON RESIN

In this step (B), 150 g of the above prepared copolymer having a water content of 28%, 229 g of t-butanol, 187 g of pure water, 0.17 g of barium hydroxide, and 0.5 g of potassium dihydrogenphosphate were introduced into a 1-liter stainless steel autoclave which was secured against pressures up to 50 atm. After exhausting the gas atmosphere of the autoclave, the temperature of the reaction mixture was increased to 90° C. Then, vinylidene fluoride monomer was continuously blown into the reaction mixture under a pressure of 20 kgf/cm$^2$, thereby conducting graft copolymerization. When 46 g of the vinylidene fluoride monomer was consumed, the blowing was terminated. Then, the reaction mixture was rapidly cooled down and at the same time the unreacted monomers were purged from the autoclave, thereby terminating the graft copolymerization. The period of graft copolymerization time was 13.8 hr. Then, while water was added to the thus obtained slurry, t-butanol and ethyl acetate used as solvents were distilled out and then recovered. With this, a dispersion of a graft copolymer in water was obtained. This dispersion was centrifuged and then dried to obtain the graft copolymer in the form of white powder. The melting temperature of this copolymer was determined to be 163° C.

Separately, chemical composition of the recovered solvents was analyzed with a gas chromatograph G-3810 (trade name) of Yanagimoto Seisakusho Co., using PORAPACK QS column, He carrier gas, an oven temperature of 150° C., an injection temperature of 180° C., and TCD detector (200° C.). With this analysis, it was found that the proportion of t-butanol/ethyl acetate/water by weight is 54.7/45.3/16.0. In the organic solvent, 100 ppm of ethanol was detected. The recovery of the organic solvent was 97%.

A sheet was prepared from the above prepared graft copolymer in the same manner as that in Example 4. This sheet was semitransparent and elastic and flexible. This sheet was subjected to the same thermal stability evaluation test as that in Example 8. The results are shown in Table 3.

To the above-recovered solvent, t-butanol and water were added so as to prepare a recovered liquid medium having the above-mentioned initial composition (i.e., weight proportions of t-butanol/ethyl acetate/water of 55/45/20). Using this recovered liquid medium, the above-mentioned graft copolymerization was conducted again, followed by the solvent recovery. In this manner, the graft copolymerization was conducted ten times in total. That is, the tenth graft copolymer was prepared at the end. The period of time of the tenth graft copolymerization was 14.0 hr. The amount of ethanol contained in the recovered solvent after the tenth graft copolymerization was 1,200 ppm based on the total weight of the organic solvent. The results of the thermal stability evaluation test on a sheet prepared from the tenth graft copolymer are shown in Table 3.

EXAMPLE 15

In this example, Example 14 was repeated except in that, in place of 0.17 g of barium hydroxide, 0.34 g of the same was used in the graft copolymerization. The period of time for completing the graft copolymerization was 13.5 hr. After the dispersion of the graft copolymer was centrifuged and then dried, 159 g of a white powder was obtained. By the same analysis of the recovered solvent as that in Example 14, it was found that the proportions of t-butanol/ethyl acetate/water by weight are 54.3/45.7/16.7. When the recovered solvent was analyzed, 50 ppm, based on the total weight of the organic solvent, of ethanol was detected. The recovery of the organic solvent was 95%.

A sheet was prepared from the above prepared graft copolymer in the same manner as that in Example 4. This sheet was semitransparent and elastic and flexible. This sheet was subjected to the same thermal stability evaluation test as that in Example 8. The results are shown in Table 3.

Furthermore as is the same as Example 14, the graft rcopolymerization was conducted ten times in total. The period of time of the tenth graft copolymerization was 13.7 hr. The amount of ethanol contained in the recovered solvent after the tenth graft copolymerization was 700 ppm based on the total weight of the organic solvent. The results of the thermal stability evaluation test on a sheet prepared from the tenth graft copolymer are shown in Table 3.

EXAMPLE 16

In this example, Example 14 was repeated except in that potassium dihydrogenphosphate was omitted in the graft copolymerization. The period of time for completing the graft copolymerization was 14.2 hr. After the dispersion of the graft copolymer was centrifuged and then dried, 163 g of a white powder was obtained. By the same analysis of the recovered solvent as that in Example 14, it was found that the proportions of t-butanol/ethyl acetate/water by weight are 55.3/44.7/15.3. When the recovered solvent was analyzed, 2,000 ppm, based on the total weight of the organic solvent, of ethanol was detected. The recovery of the organic solvent was 95%.

A sheet was prepared from the above prepared graft copolymer in the same manner as that in Example 4. This sheet was semitransparent and elastic and flexible. This sheet was subjected to the same thermal stability evaluation test as that in Example 8. The results are shown in Table 3.

Furthermore, the graft copolymerization was conducted two times in total by using the recovered solvent as described in Example 14. The period of time of the second graft copolymerization was 25.1 hr. The amount of ethanol contained in the recovered solvent after the second graft copolymerization was 4,200 ppm based on the total weight of the organic solvent. The results of the thermal stability evaluation test on a sheet prepared from the tenth graft copolymer are shown in Table 3.

COMPARATIVE EXAMPLE 9

In this comparative example, Example 14 was repeated except in that barium hydroxide and potassium dihydrogenphosphate were omitted in the graft copolymerization. The period of time for completing the graft copolymerization was 18.5 hr. After the dispersion of the graft copolymer was centrifuged and then dried, 150 g of a white powder was obtained. When the recovered solvent was analyzed, 5,400 ppm, based on the total weight of the organic solvent, of ethanol was detected. The recovery of the organic solvent was 93%.

A sheet was prepared from the above prepared graft copolymer in the same manner as that in Example 4. This sheet was subjected to the same thermal stability evaluation test as that in Example 8. The results are shown in Table 3.

COMPARATIVE EXAMPLE 10

In this comparative example, Example 14 was repeated except in that, in place of barium hydroxide and potassium dihydrogenphosphate, 0.17 g of sodium hydroxide was used in the graft copolymerization. The period of time for completing the graft copolymerization was 14.8 hr. When the recovered solvent was analyzed, 3,000 ppm, based on the total weight of the organic solvent, of ethanol was detected.

A sheet was prepared from the above prepared graft copolymer in the same manner as that in Example 4. This sheet was subjected to the same thermal stability evaluation test as that in Example 8. The results are shown in Table 3.

COMPARATIVE EXAMPLE 11

In this comparative example, Example 14 was repeated except in that, in place of barium hydroxide and potassium dihydrogenphosphate, 0.17 g of calcium hydroxide was used in the graft copolymerization. The period of time for completing the graft copolymerization was 14.6 hr. When the recovered solvent was analyzed, 2,800 ppm, based on the total weight of the organic solvent, of ethanol was detected.

A sheet was prepared from the above prepared graft copolymer in the same manner as that in Example 4. This sheet was subjected to the same thermal stability evaluation test as that in Example 8. The results are shown in Table 3.

TABLE 3

|  | Number of Graft Copolymerizations | Graft Copolymerization Time (hr) | Ethanol Conc. (ppm) | b Values before test | b Values after test |
|---|---|---|---|---|---|
| Example 14 | One Time | 13.8 | 100 | 2.0 | 5.3 |
| " | Ten Times | 14.0 | 1,200 | 2.3 | 6.2 |
| Example 15 | One Time | 13.5 | 50 | 4.1 | 8.5 |
| " | Ten Times | 13.7 | 700 | 4.3 | 9.1 |
| Example 16 | One Time | 14.2 | 2,000 | 3.5 | 7.4 |
| " | Two Times | 25.1 | 4,200 | 4.0 | 8.2 |
| Com. Ex. 9 | One Time | 18.5 | 5,400 | 6.3 | 10.5 |
| Com. Ex. 10 | One Time | 14.8 | 3,000 | 12.0 | 15.0 |
| Com. Ex. 11 | One Time | 14.6 | 2,800 | 10.8 | 14.1 |

What is claimed is:

1. A method of producing an elastic fluorohydrocarbon resin, said method comprising the steps of:
   (a) conducting a copolymerization of at least one first monomer having (i) at least one double bond and (ii) at least one peroxy bond having a decomposition temperature higher than the reaction temperature of said copolymerization, with at least one second fluorine-containing monomer, such that a fluorine-containing elastomeric copolymer having a peroxy bond capable of decomposition during graft copolymerization is produced;
   (b) contacting said fluorine-containing elastomeric copolymer with a barium salt such that said fluorine-containing elastomeric copolymer is purified;
   (c) providing, in a liquid medium, a dispersion of said fluorine-containing elastomeric copolymer;
   (d) introducing into said dispersion at least one third monomer which comprises at least one fluorine-containing monomer and which is capable of providing a crystalline polymer having a melting temperature not lower than 130° C.; and
   (e) polymerizing said third monomer in said dispersion so as to cause decomposition of said peroxy bond, thereby causing at least a portion of said third monomer to undergo graft copolymerization with said elastomeric polymer.

2. A method according to claim 1, wherein said at least one second fluorine-containing monomer is at least one selected from the group consisting of a combination of vinylidene fluoride and hexafluoropropylene, a combination of vinylidene fluoride, hexafluoropropylene and tetrafluoroethylene, a combination of vinylidene fluoride and chlorotrifluoroethylene, a combination of tetrafluoroethylene and propylene, a combination of tetrafluoroethylene and a fluorine-substituted vinyl ether, and a combination of a conjugated diene and a fluorine-containing monomer.

3. A method according to claim 1, wherein said at least one first monomer is selected from the group consisting of t-butyl peroxymethacrylate, di(t-butyl peroxy)fumarate, t-butyl peroxycrotonate, t-butyl peroxyallylcarbonate, t-hexylperoxyallylcarbonate, 1,1,3,3-tetramethylperoxyallylcarbonate, t-butylperoxymethacrylcarbonate, 1,1,3,3-tetramethylbutylperoxymethacrylcarbonate, p-menthane peroxyallycarbonate, and p-menthane peroxymethacrylcarbonate.

4. A method according to claim 1, wherein said barium salt is at least one compound selected from the group consisting of barium hydroxide, barium oxide, barium peroxide, barium chloride, barium bromide, barium iodide, barium chlorate, barium perchlorate, barium nitrate.

5. A method according to claim 1, wherein said barium salt is used in the step (b) in the form of aqueous solution.

6. An elastic fluorohydrocarbon resin prepared in accordance with said method of claim 1 and comprising a first segment which comprises a fluorine-containing elastomeric polymer and a second segment which comprises a fluorine-containing crystalline polymer having a melting temperature not lower than 130° C., said second segment being at least partly grafted to said first segment.

7. A resin according to claim 6, wherein said crystalline polymer is at least one selected from the group consisting of polytetrafluoroethylene, polychlorotrifluoroethylene, polyvinylidene fluoride, polyvinyl fluoride, copolymers of tetrafluoroethylene and ethylene, copolymers of chlorotrifluoroethylene and ethylene, copolymers of tetrafluoroethylene and a fluorine-substituted vinyl ether, copolymers of vinylidene fluoride and tetrafluoroethylene, copolymers of vinylidene fluoride and chlorotrifluoroethylene, copolymers of vinylidene fluoride and hexafluoropropylene, copolymers of vinylidene fluoride and trifluoroethylene, copolymers of vinylidene fluoride and hexafluoroacetone, and copolymers of vinylidene fluoride, tetrafluoroethylene and hexafluoropropylene.

8. A method of producing an elastic fluorohydrocarbon resin, said method comprising the steps of:
   (a) conducting a copolymerization of at least one first monomer having (i) at least one double bond and (ii) at least one peroxy bond having a decomposition temperature higher than the reaction temperature of said copolymerization, with at least one second fluorine-containing monomer to produce a fluorine-containing elastomeric copolymer having a glass transition temperature below room temperature and a peroxy bond capable of decomposition during graft copolymerization;
   (b) adjusting water content of said fluorine-containing elastomeric copolymer such that said copolymer contains 0.1–50 wt % of water;
   (c) introducing said fluorine-containing elastomeric copolymer into a liquid medium such that a dispersion of said fluorine-containing elastomeric copolymer is provided;
   (d) introducing into said dispersion at least one third monomer which comprises at least one fluorine-containing monomer and which is capable of providing a crystalline polymer having a melting temperature not lower than 130° C.; and
   (e) polymerizing said third monomer in said dispersion so as to cause decomposition of said peroxy bond, thereby causing at least a portion of said third monomer to undergo graft copolymerization with said elastomeric copolymer.

9. A method according to claim 8, wherein said liquid medium comprises tertiary butanol and water.

10. A method according to claim 9, wherein said liquid medium further comprises one of a carboxylic ester and a chlorine-containing solvent.

11. A method according to claim 10, wherein said carboxylic ester is one selected from the group consisting of ethyl acetate, isopropyl acetate, n-butyl acetate, t-butyl acetate, ethyl formate, methyl propionate, and ethyl propionate.

12. A method according to claim 10, wherein said chlorine-containing solvent is one selected from the group consisting of dichloroethane, tetrachloroethylene, trichloroethylene, trichloroethane, chloroform, methylene chloride and chlorobenzene.

13. A method according to claim 11, wherein said carboxylic ester is said ethyl acetate.

14. A method according to claim 12, wherein said chlorine-containing solvent is one of 1,1,1-trichloroethane and methylene chloride.

15. A method of producing an elastic fluorohydrocarbon resin, said method comprising the steps of:

(a) conducting a copolymerization of at least one first monomer having (i) at least one double bond and (ii) at least one peroxy bond having a decomposition temperature higher than the reaction temperature of said copolymerization, with at least one second fluorine-containing monomer to produce a fluorine-containing elastomeric copolymer having a glass transition temperature below room temperature and a peroxy bond capable of decomposition during graft copolymerization;

(b) introducing said fluorine-containing elastomeric copolymer into a liquid medium containing tertiary butanol, water, carboxylic ester, and a metal hydroxide such that a dispersion of said fluorine-containing elastomeric copolymer is provided;

(c) introducing into said dispersion at least one third monomer which comprises at least one fluorine-containing monomer and which is capable of providing a crystalline polymer having a melting temperature not lower than 130° C.; and (d) polymerizing said third monomer in said dispersion so as to cause decomposition of said peroxy bond, thereby causing at least a portion of said third monomer to undergo graft copolymerization with said elastomeric copolymer.

16. A method according to claim 15, wherein said metal hydroxide at step (b) is barium hydroxide.

17. A method according to claim 15, wherein said liquid medium at step (b) further contains at least one additive selected from the group consisting of potassium dihydrogenphosphate, dipotassium hydrogenphosphate, potassium hydrogenphthalate, sodium citrate, sodium tetraborate, potassium dihydrogencitrate, sodium dihydrogenphosphate, and disodium hydrogenphosphate.

18. A method according to claim 17, wherein said at least one additive comprises said potassium dihydrogenphosphate.

19. A method according to claim 15, wherein said carboxylic ester at step (b) is ethyl acetate.

* * * * *